(12) United States Patent
Calvert

(10) Patent No.: US 8,608,893 B2
(45) Date of Patent: Dec. 17, 2013

(54) BLUE-LIGHT CURED ADHESIVES FOR JOINING FABRIC

(75) Inventor: Paul D. Calvert, Assonet, MA (US)

(73) Assignee: University of Massachusetts, North Dartmouth, MA (US)

( * ) Notice: Subject to any disclaimer, the term of this patent is extended or adjusted under 35 U.S.C. 154(b) by 361 days.

(21) Appl. No.: 12/354,987

(22) Filed: Jan. 16, 2009

(65) Prior Publication Data

US 2009/0183826 A1 Jul. 23, 2009

Related U.S. Application Data

(60) Provisional application No. 61/021,968, filed on Jan. 18, 2008.

(51) Int. Cl.
*B29C 65/62* (2006.01)

(52) U.S. Cl.
USPC .......................... 156/275.3; 156/88; 156/304.7

(58) Field of Classification Search
USPC ..................... 156/275.3, 88, 304.7
See application file for complete search history.

(56) References Cited

U.S. PATENT DOCUMENTS

| | | | | |
|---|---|---|---|---|
| 2,640,798 A | * | 6/1953 | Langer | 156/176 |
| 3,567,544 A | | 3/1971 | Nichols | |
| 3,755,033 A | * | 8/1973 | Emus | 156/88 |
| 4,938,817 A | | 7/1990 | Langley | |
| 5,092,376 A | * | 3/1992 | Blankenship et al. | 141/25 |
| 5,313,897 A | * | 5/1994 | Katamine et al. | 112/470.13 |
| 6,579,403 B2 | | 6/2003 | Tolbert et al. | |
| 8,283,181 B2 | * | 10/2012 | Pinkel et al. | 436/180 |
| 2003/0114553 A1 | * | 6/2003 | Karim et al. | 523/115 |
| 2003/0138651 A1 | * | 7/2003 | Kendall et al. | 428/506 |
| 2007/0077836 A1 | * | 4/2007 | Bansal et al. | 442/148 |

FOREIGN PATENT DOCUMENTS

| | | | | |
|---|---|---|---|---|
| GB | 1127691 | * | 9/1968 | |
| JP | 06192904 A | * | 7/1994 | A41H 43/04 |
| WO | 99/29198 A1 | | 6/1999 | |
| WO | WO 99/52710 | * | 10/1999 | |

OTHER PUBLICATIONS

NOA 88 adhesive archived Sep. 20, 2003, http://www.norlandprod.com/adhesives/noa%2088.html, http://web.archive.org/web/20030920010609/http://www.norlandprod.com/adhesives/NOA%2088.html.*
JP 06192904 A English Abstract.*
Loctite® 3105 Product page, http://www.henkelna.com/cps/rde/xchg/henkel_us/hs.xsl/full-product-list-7932.htm?countryCode=us&BU=industrial&parentredDotUID=productfinder&redDotUID=0000000I34, accessed Aug. 7, 2012.*
P. Calvert, P. Patra, "Blue-cured adhesive for bonding and 3D medical textiles", National Textile Center Annual Report: Nov. 2007, p. 1-3.*

(Continued)

*Primary Examiner* — Richard Crispino
*Assistant Examiner* — Elizabeth Royston
(74) *Attorney, Agent, or Firm* — Chapin IP Law, LLC

(57) ABSTRACT

A system is provided for joining fabrics by lines or arrays of dots of adhesive, the system comprising: a blue light source; a dispenser, disposed proximally with the blue light source, the dispensing system being configured to deposit at least one drop of a monomer on first and second proximate fabric surfaces; a conveyance whereby the light source and the dispensing system change position relative to the first and second fabric surfaces.

7 Claims, 2 Drawing Sheets

(56) References Cited

OTHER PUBLICATIONS

Stahl, Franka et al., "Light-Emitting Diode (LED) Polymerisation of Dental Composites: Flexural Properties and Polymerisation Potential", Elsevier Science, 2000, pp. 1379-1385.

Teshima, Wataru et al., "ESR Study of Camphorquinone/Amine Photoinitiator Systems Using Blue Light-Emitting Diodes", Elsevier Science, 2003, pp. 2097-2103.

Uhl, Alexander et al., "Polymerization and Light-Induced Heat of Dental Composites Cured with LED and Halogen Technology", Elsevier Science, 2003, pp. 1809-1820.

Uhl, Alexander et al., "Photoinitiator Dependent Composite Depth of Cure and Knoop Hardness with Halogen and LED Light Curing Units", Elsevier Science, 2003, pp. 1787-1795.

* cited by examiner

BLUE-LIGHT CURED ADHESIVES FOR JOINING FABRIC

RELATED APPLICATIONS

This application claims the benefit of U.S. Provisional Application No. 61/021,968 filed Jan. 18, 2008. This application is herein incorporated in its entirety by reference.

STATEMENT OF GOVERNMENT INTEREST

The U.S. Government has a paid-up license in this invention and the right in limited circumstances to require the patent owner to license others on reasonable terms as provided for by the terms of 02-0740 awarded by the National Textile Center under the authority of the Department of Commerce and administered on behalf of said Department by Clemson University.

FIELD OF THE INVENTION

The invention relates to light cured fabric adhesives, and more particularly, to a light cured fabric adhesive cured by blue light.

BACKGROUND OF THE INVENTION

Ultraviolet (UV) cured acrylic adhesives have been used in various applications including the joining of transparent materials and coatings. Blue light (with a wavelength of approximately 400-475 nm) may used in lieu of ultraviolet to cure materials, and has particularly been used in dental applications and other applications where ultraviolet light might damage tissues. Light emitting diodes provide convenient, small, and intense light sources and are increasingly available with wavelengths in the blue range.

It is possible to induce an acrylate cross-linking reaction by light at wavelengths up into the near IR. There were some early holographic technologies for data storage based on laser diodes running at around 750-800 nm wavelength in combination with IR-sensitive dyes. However, quantum efficiencies are not high at these long wavelengths and greatly improve as the photon energy increases. UV curing is often done with lamps of fairly low brightness but with high quantum efficiency.

Blue light curing of dental composite materials has been used for 15 years. Mixtures of multifunctional acrylate monomers and inorganic filler are cured in the mouth using a light-pipe from a blue light source. This system is more controllable than catalyzed thermal curing and more acceptable to patients and dentists than a UV source. This market is rapidly adopting the new LED sources since they became available a few years ago. In the last year or two, the brightness of these LEDs has been increasing rapidly and the wavelength is moving down. Blue and violet LED lasers are also just becoming available.

UV-induced free radical polymerization is generally catalyzed by aromatic dyes, such as Michler's ketone which transfers its excited state energy to a peroxide co-catalyst that generates free radicals. The dental blue-light curing system, developed by 3M, is based on camphorquinone as a free radical generating curing agent for mixture of methacrylate monomers. Triethanolamine is sometimes used as a co-catalyst to accelerate the reaction. In common with other free radical curing, this reaction is inhibited by oxygen.

A third widely-used UV curing system is based on photo-acid generators in which epoxy-anhydride systems cure by release of acid. The system is particularly attractive because it is not affected by oxygen. At this point there is no widely-used blue version of this chemistry.

UV curable resins are widely used for coating applications, they are used as photoresists for printed circuit boards and integrated circuits and for adhesives where a heat cure would damage the product or where heat is difficult to apply. One adhesive example is the sealing of windshields and rear windows into automobiles. UV curing is also used in some high performance printing inks.

UV cured adhesives are not widely used in the textile industry, although various other treatments including printed inks may be UV cured. Hot melt adhesives are widely used to attach linings and for bonding of fibers in some non-wovens. These adhesives have not been used as a substitute for stitching probably because it is difficult to deliver these viscous materials in the form of small strong dots connecting two fabrics.

What is needed, therefore, are techniques for using adhesives to provide a line of small junction points between two fabrics, equivalent to stitching. The combination of the new small intense blue light sources with a system for delivering small isolated dots of curable monomers makes possible an adhesive system equivalent to a sewing machine. Curing times are optimally of a few seconds or less in order that the process can occur at reasonable speeds. The light source should be in the visible region in order to allow the operator to see it and use the equipment without danger of eye damage.

SUMMARY OF THE INVENTION

One embodiment of the present invention provides a system for joining fabrics by an array of dots of adhesive, the system comprising: a visible light source; a dispenser, disposed proximally with the blue light source, the dispensing system being configured to deposit at least one aliquot of a monomer on first and second proximate fabric surfaces; a conveyance whereby the light source and the dispensing system change position relative to the first and second fabric surfaces.

Another embodiment of the present invention provides such a system wherein the fabric is selected from the group of fabrics consisting of woven and unwoven textiles, paper, porous material, and membranes.

A further embodiment of the present invention provides such a system wherein the fabric is joined to a solid material.

Yet another embodiment of the present invention provides such a system wherein the visible light source is selected from the light sources emitting blue or violet visible light.

A yet further embodiment of the present invention provides such a system wherein the aliquot has a volume of between about approximately 1 pL to 1 nL.

Still another embodiment of the present invention provides such a system wherein the blue light source has a wavelength of between about approximately 400 nm and about approximately 480 nm.

A still further embodiment of the present invention provides such a system wherein the light source is selected from the group of light sources consisting of lasers and light emitting diodes.

Even another embodiment of the present invention provides such a system wherein the monomer is an unsaturated monomer capable of polymerization by free radical or ionic polymerization.

An even further embodiment of the present invention provides such a system wherein the monomer is selected from the group of monomers consisting of acrylic monomers, methacrylate monomers, vinylpyrrolidone, styrenics, and combinations thereof.

Yet still another embodiment of the present invention provides such a system wherein the monomer is a photocureable combination of an epoxy resin and a curing agent.

A yet still further embodiment of the present invention provides such a system wherein the dispenser comprises a dispenser selected from the group of dispensers consisting of a motorized syringe, a syringe pump or gas pressure-driven syringe, and derivatives thereof.

Yet even another embodiment of the present invention provides such a system wherein the dispenser comprises a dispenser selected from the group of dispensers consisting of inkjets and microdrop systems.

One embodiment of the present invention provides a method for joining fabric layers, the method comprising: clamping fabric together on a support; setting a syringe height to facilitate delivery of an adhesive to the fabric; priming the syringe and wiping a head of the syringe; disposing the fabric proximate to the head; injecting the adhesive between layers of the fabric with the syringe; exposing a portion of the fabric having the adhesive injected therein to a curing light beam; removing the fabric.

Another embodiment of the present invention provides such a method further comprising repeating the steps of: priming the syringe and wiping a head of the syringe; disposing the fabric proximate to the head; injecting the adhesive between layers of the fabric with the syringe; exposing a portion of the fabric having the adhesive injected therein to a curing light beam; thereby creating a seam.

A further embodiment of the present invention provides such a method further wherein the seam comprises a plurality of spaced injections of adhesive.

Yet another embodiment of the present invention provides such a method further comprising further comprising holding down the layers of fabric prior to injection of the adhesive.

A yet further embodiment of the present invention provides such a method further comprising wherein the adhesive is a monomer.

Even another embodiment of the present invention provides such a method further comprising wherein the curing light beam has a wavelength of between about approximately 400-470 nm.

An even further embodiment of the present invention provides such a method further comprising wherein the light beam has an intensity of about approximately 14 lumens.

Still another embodiment of the present invention provides such a method further comprising wherein the light beam is provided by a light emitting diode.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
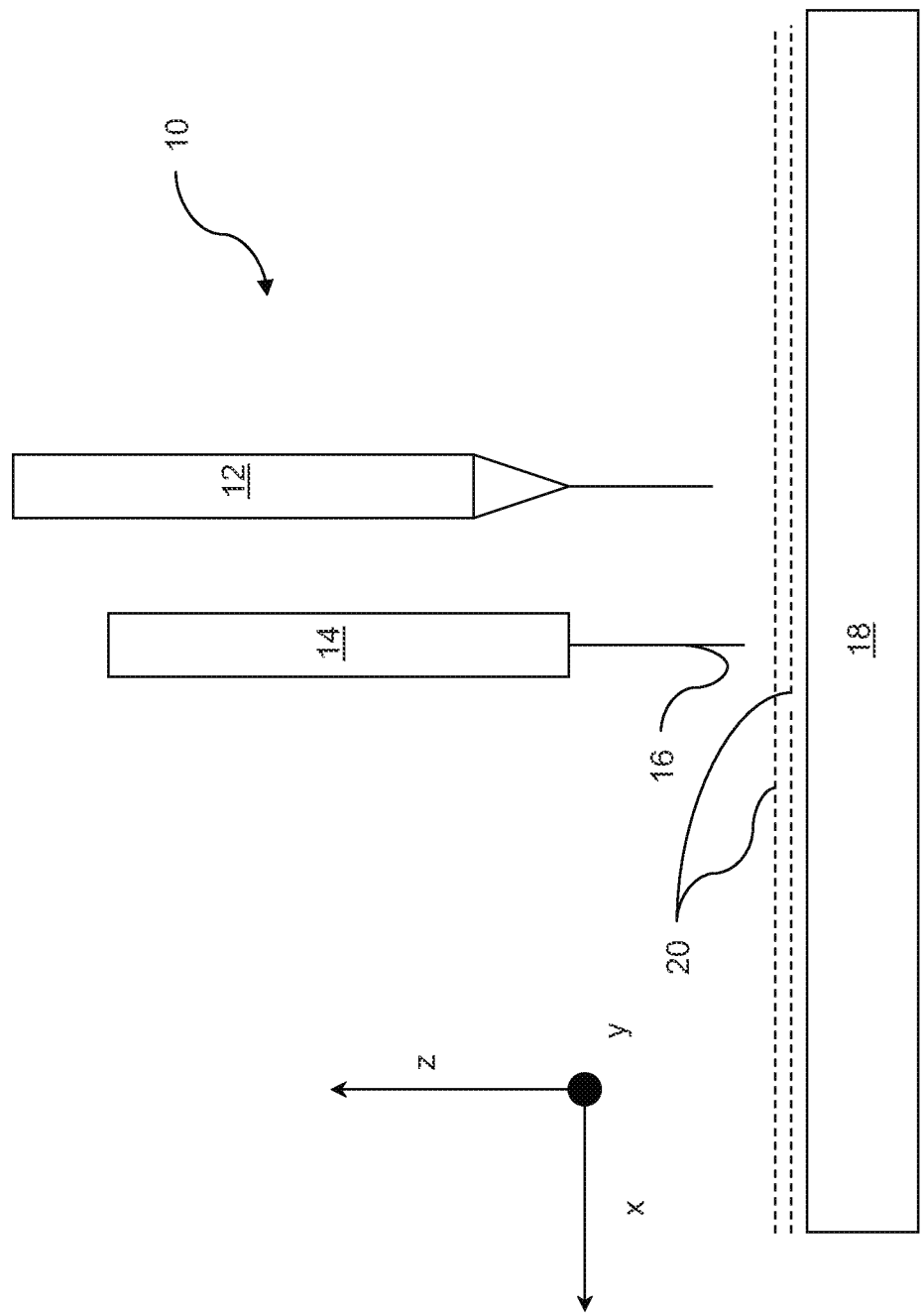
FIG. 1 is a block diagram illustrating a system for the adhesion of fabric layers configured in accordance with one embodiment of the present invention.

A system 10 for the application of a blue light curable acrylic adhesive to a fabric configured according to one embodiment of the present invention is illustrated in FIG. 1. In such a system 10, monomers are deposited with a catalyst by a syringe or other deposition tool 12 upon or between a plurality of fabric layers 20 disposed upon a non-wetting, soft surface 18 configured for movement in the x-y plane. The syringe 12 is configured for movement in the z direction, to facilitate injection of the monomer-catalyst mixture through, between or upon the fabric layers 20. Proximal to the syringe 12 is disposed a light source 14 emitting a focused beam of light with a wavelength in the blue light range 16. The fabric joined may be woven or nonwoven textile, a porous membrane, paper, or such other materials having adequate porosity to allow for the adhesion of the adhesive once cured. Such a porous fabric may also be joined to a sheet of dense flexible material.

Figure 2:
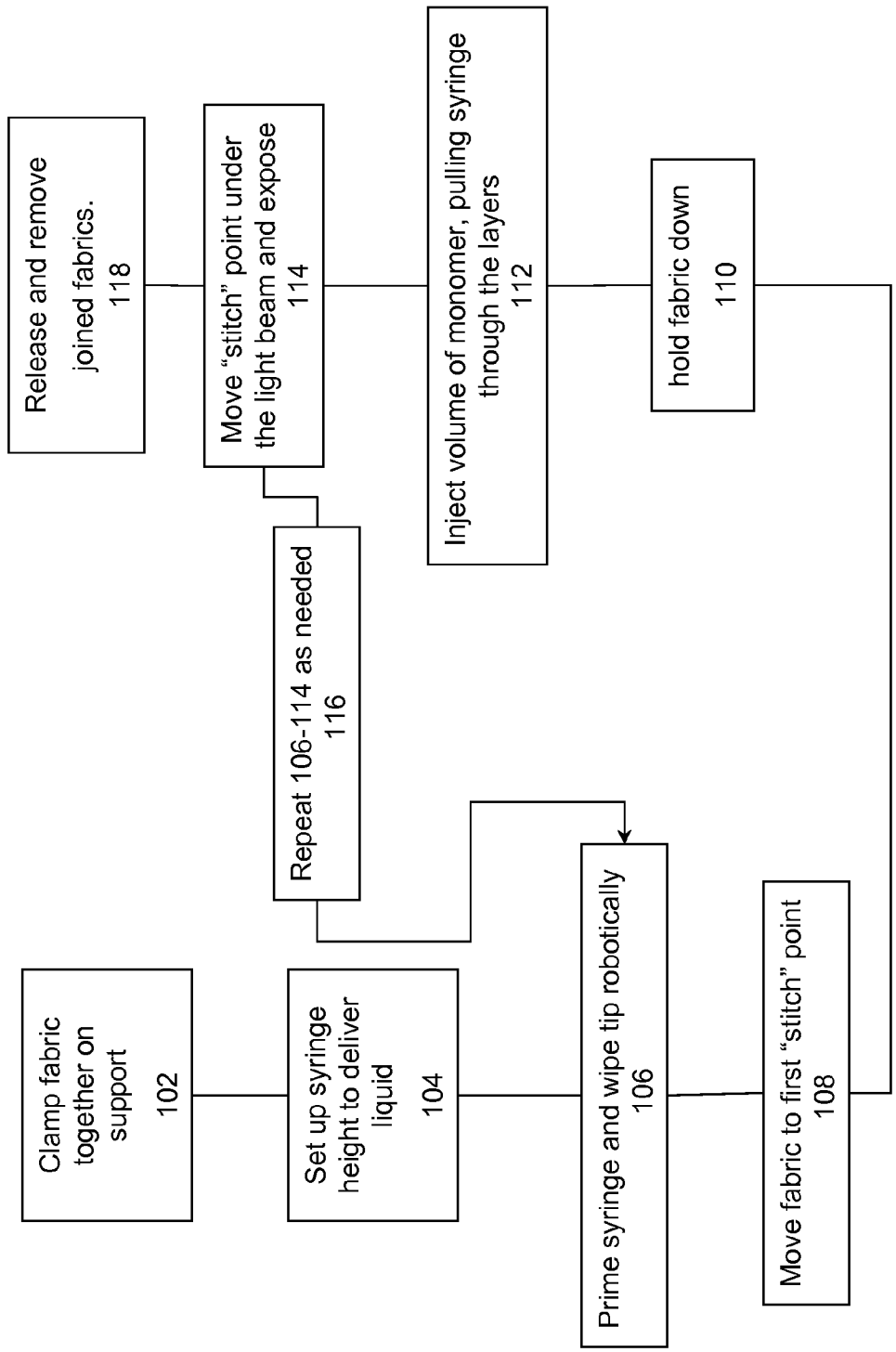
FIG. 2 is a flow chart illustrating a method for the adhesion of fabric layers configured in accordance with one embodiment of the present invention.

Such a system may be used in a method in accord with one embodiment of the present invention illustrated in the flow chart of FIG. 2. In such a method, layers of fabric are clamped to a soft, non-wetting support 102. A syringe, as illustrated in FIG. 1, is set up at a height suitable to deliver a mixture of monomer and curing agent or catalyst to the fabric layers 104. The syringe is then primed and its tip is wiped, in one embodiment, robotically 106. The fabric is then moved and positioned in a first "stitch" point 108. In some embodiments, it may be necessary to hold the fabric down locally 110. The fabric may be held in place by a ring or annular presser foot disposed surrounding the locus of adhesion 112. A volume of monomer and catalyst mixture may then be disposed by inserting the syringe through the fabric layers 114. The fabric may then be repositioned at a new locus of adhesion or "stitch" point under the light beam and expose 116. This process may be repeated as many times as necessary 116 before the fabric is released and removed as joined fabric layers 118.

The application of acrylic adhesive to a fabric by such a system, may, in one embodiment be a 1 mm spot size. Spot size may be adjusted from 0.1 mm up based on the desired application, to balance the structural demands on the product and the required curing properties. Seam flexibility and strength are among those factors considered. Spots may be configured in clusters, in rows or individually as required by each application.

In one embodiment, a dispensing system dispenses a selected monomer and photoinitiator onto a target fabric at a selected spot size. The selected spot size may then be exposed to focused blue or violet visible light emitted from a LED. In one embodiment the LED may be selected with a wavelength to match that of the absorption of the photo initiator. In one such embodiment, the LED selected may have a wavelength of 400-470 nm and an intensity of about approximately 10 lumens. One such LED is available under the trademark Luxeon. Alternative embodiment of the present invention provide a laser light source. Such a light source may have a central wavelength 405 nm, optical power output 30 mW. One skilled in the art will readily appreciate that other, more powerful light sources or diode lasers may also be used.

In one embodiment, the selected monomer may be pentaerythritrol propoxylate triacrylate. In one such embodiment, the photoinitiator selected may be camphorquinone (absorption peak 468 nm). One skilled in the art will appreciate that other photoinitiators may also be used. Such an embodiment utilizes between 0.5 to 2.0% initiator by weight. Alternative embodiments may use Glycerol 1, 3,-diglycerolate diacrylate as a monomer and provide 0.5% to 1% of the photoinitiator. In one embodiment, Poly ethylene glycol diacrylate (PEGDA) was used as a primary oligomer with camphorquinone (CQ) and dimethyl p-toluidene (DMPT) respectively as photoinitiator and coinitiator. In such an embodiment, fumed silica was added to increase viscosity of the prepolymer solution and control spreading of the fluid in the fabric. In some embodiments, monomers selected are preferably viscous or non-wetting monomers which would resist spot spreading.

In one embodiment, a robot mounted syringe system is used to dispense single dots of the adhesive onto the substrate textile such that syringe motion replaces or supplements the need for a fabric transport system. The system may be configured with the LED attached proximal to the syringe on the robot in order to immediately expose the dots to light of the appropriate intensity and wavelength to be absorbed by the photoinitiator.

In one embodiment, a plurality of syringe dispensers may be used in an array, disposed proximal to a plurality of LEDs. Such an arrangement would facility rapid attachment of textiles. Such arrays of syringes may be one dimensional or two dimensional and may be either intersperse or separated from corresponding arrays of LEDs.

Since oxygen inhibition is a well-known problem of acrylic curing, steps should be taking to minimize the availability of oxygen within the monomer system during cure. Such methods should seek to minimize exposure to atmospheric oxygen and the time between deposition and curing. One skilled in the art will appreciate that cure time is affected by the choice of adhesive, the presence or absence of catalysts and the availability of molecular oxygen in the adhesive.

According to one embodiment, the acrylic adhesive would be exposed to blue light for a period of 10 seconds allowing it to cure.

As is well known in the art, methods to limit oxygen ingress or purge oxygen from the adhesive may also be used to reduce or control cure time.

In an alternative embodiment of the present invention, other means for depositing the monomer may be obtained. Deposition could also be by inkjet printing, or any other fluid dispensing system.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Strength of cured 1 mm dots as a function of cure time. The fabric tears, rather than the dot failing, at 20 Newtons. Diglyceroldiacrylate monomer, 1% camphorquinone photoinitiator.

| Cure type | Cure time, sec | Spot strength, Newtons |
|---|---|---|
| LED | 5 | 1.1 |
|  | 15 | 1.3 |
|  | 30 | 1.7 |
|  | 60 | 2.7 |
|  | 120 | 2.8 |
| Laser | 5 | 3 |
|  | 15 | 8 |
|  | 30 | 11 |
|  | 60 | 15 |
|  | 120 | 20 |

What is claimed is:

1. A method for joining fabric layers, said method comprising:
    clamping fabric together on a support;
    setting a syringe height to facilitate delivery of an adhesive to said fabric;
    adjusting a spot formed by each of the microdrops in the array of microdrops by adjusting a volume of an aliquot of adhesive between about approximately 1 pL to 1 nL;
    priming a syringe and wiping a head of said syringe;
    disposing said fabric proximate to said head;
    inserting said head of said syringe through at least one layer of said fabric;
    injecting an array of microdrops of said adhesive between layers of said fabric with said syringe;
    exposing a portion of said fabric having said adhesive injected therein to a curing visible light beam;
    conveying a light source of the curing visible light beam and said syringe to a different position relative to said fabric; and
    removing said fabric.

2. The method according to claim 1 wherein said adhesive is a diglyceroldiacrylate monomer combined with a camphorquinone photoinitiator and fumed silica.

3. The method according to claim 1 wherein said light beam has an intensity of about approximately 14 lumens; and
    further comprising curing said adhesive in less than ten seconds.

4. The method according to claim 1, wherein the spot size is adjusted from about 0.1 mm to 1 mm.

5. The method according to claim 1, wherein said support comprises a fabric transport system having a non-wetting soft surface; and
    conveying the light source and syringe further comprises moving said transport system in an x-y plane disposed perpendicular to an axis of said syringe.

6. The method according to claim 1, wherein said syringe comprises a robot mounted syringe system, and
    conveying the light source and syringe further comprises moving the robot mounted syringe system in three dimensions.

7. The method according to claim 1, wherein said syringe comprises an array of syringes interspersed with a corresponding array of LEDs and the array of microdrops is a two dimensional array.

* * * * *